United States Patent
Nelson

(12) United States Patent (10) Patent No.: US 9,118,186 B2
Nelson (45) Date of Patent: Aug. 25, 2015

(54) MULTIPLE OUTLET SEQUENCED POWER STRIP

(71) Applicant: Peter F Nelson, Potomac, MD (US)

(72) Inventor: Peter F Nelson, Potomac, MD (US)

( * ) Notice: Subject to any disclaimer, the term of this patent is extended or adjusted under 35 U.S.C. 154(b) by 357 days.

(21) Appl. No.: 13/746,303

(22) Filed: Jan. 21, 2013

(65) Prior Publication Data

US 2014/0203642 A1 Jul. 24, 2014

(51) Int. Cl.
*H02J 3/00* (2006.01)
*H01H 43/00* (2006.01)

(52) U.S. Cl.
CPC ............... *H02J 3/00* (2013.01); *H01H 43/005* (2013.01); *Y10T 307/414* (2015.04); *Y10T 307/484* (2015.04)

(58) Field of Classification Search
CPC .......................... H01H 43/005; Y10T 307/484
USPC .......................................................... 307/41
See application file for complete search history.

(56) References Cited

U.S. PATENT DOCUMENTS

| 4,215,277 A | * | 7/1980 | Weiner et al. | 307/41 |
| 4,580,061 A | * | 4/1986 | Jackson | 307/41 |
| 4,678,926 A | * | 7/1987 | Davis | 307/11 |

* cited by examiner

*Primary Examiner* — Fritz M Fleming

(57) ABSTRACT

A multiple outlet sequenced power strip with only a specific number of outlets capable of running at any one time which is comprised of at least: a housing, input and output outlets, and a form of variable motor; thus allowing for the possible use of multiple high power devices on one wall socket and any breaker.

3 Claims, 2 Drawing Sheets

MULTIPLE OUTLET SEQUENCED POWER STRIP

FIELD OF THE INVENTION

The present invention relates generally to the field of power outlets and, more specifically, to a power outlet capable of restricting the number of power consuming devices per wall outlet and limiting the amount of time each device is capable of consuming power.

BACKGROUND OF THE INVENTION

Generally speaking, only certain amounts of power can be obtained from a wall outlet, at any one time. The solution to such a problem doesn't reside in finding another outlet within the vicinity of the previous outlet, as tripping the breaker becomes the new concern.

By restricting and rotating the devices on an outlet such that each device receives the same amount of power over the same period of time, multiple high power devices capable, together, of tripping the circuit breaker can be used in one wall outlet without tripping any circuit breaker.

SUMMARY OF THE INVENTION

It is the object of the present invention to allow for the powering of multiple high power requiring devices through only one wall outlet.

In accordance with one embodiment of the invention, a multiple relay power strip which at least comprises input and output outlets and a form of variable motor within a housing.

DETAILED DESCRIPTION OF THE PREFERRED EMBODIMENT

Figure 1:
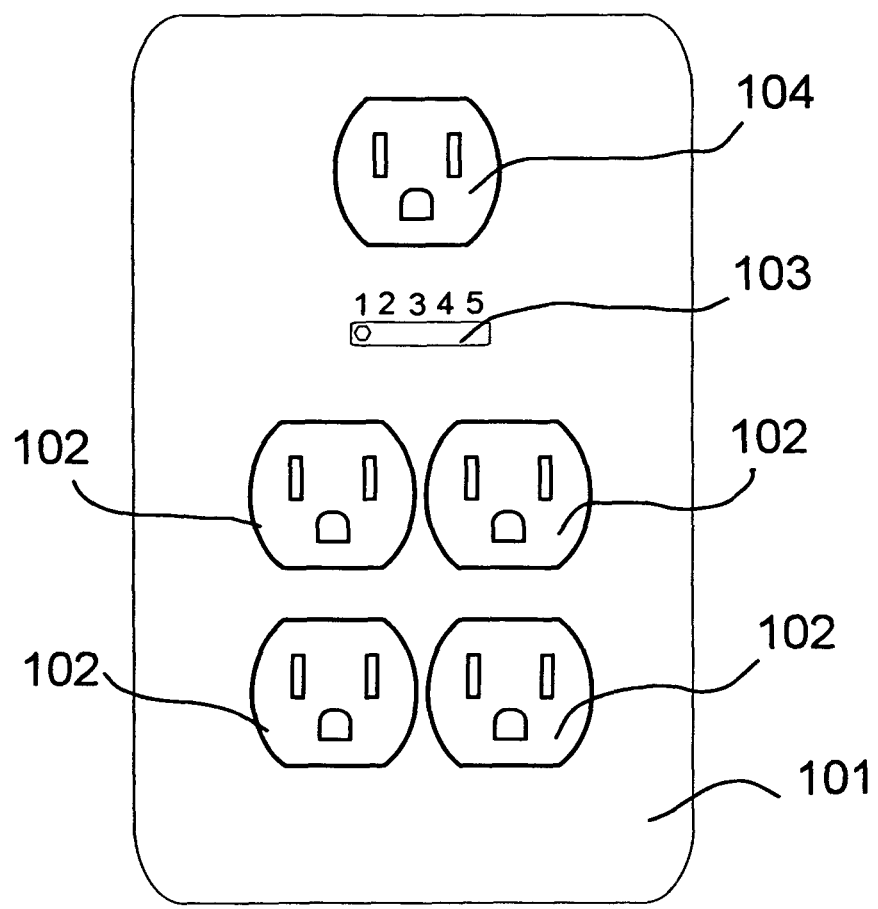
FIG. 1 depicts an assembly view of the device which is comprised of a housing 101, multiple female output outlets 102, a variable speed switch (VSS) 103, and a male input outlet 104.
Figure 2:
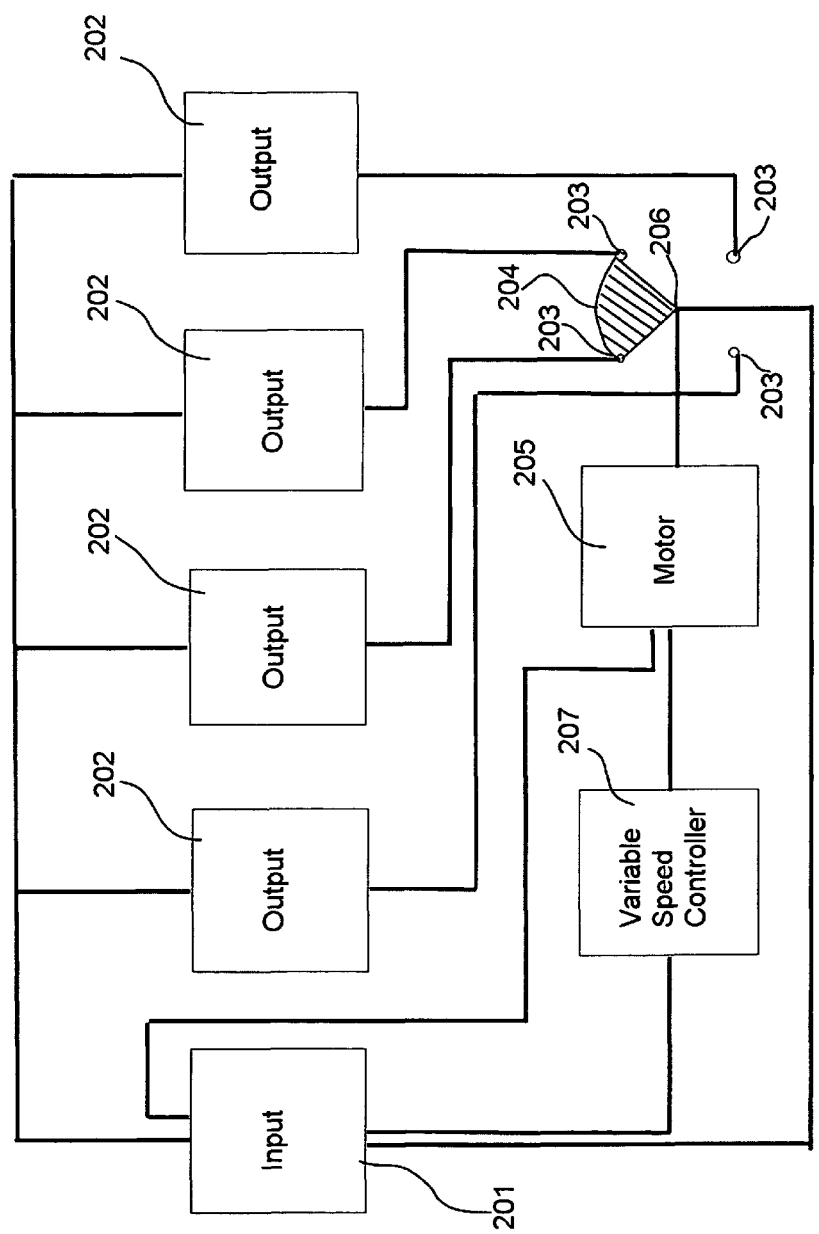
FIG. 2 is a functional block diagram for the device and includes: an input outlet 201, multiple output outlets 202, multiple rotational points of contact (RPC) 203 equal to the number of output outlets, a disk switch 204, a form of variable motor 205, a shaft 206 connecting the motor to the disk switch, and a variable speed controller (VSC) 207.

Upon connection of a power source into the input outlet 104 and multiple power consumers into the multiple output outlets 202, the device will automatically begin operation. As described in FIG. 2, a possible schematic would include: an input outlet 201, multiple output outlets 202, multiple rotational points of contact (RPC) 203 equal to the number of output outlets, a disk switch 204, and a form of variable motor 205. Upon operation, the variable motor 205 will begin to rotate, as it is connected to the input outlet. The variable speed controller 207 has the wires passing through it before they reach the variable motor 205 and is thus able to limit the speed of the variable motor 205 through a speed control circuit. Both the RPC 203 and the disk switch 204 are made of a metal conductor. The disk switch 204 is connected to the power input through an electrical conducting wire and the RPC's 203 are connected to their respective output outlets through electrical conducting wires.

As the form of variable motor 205, which at the end of the rotating shaft 206 is connected to the disk switch 204, begins to rotate, the disk switch 204 will come into contact with an RPC 203 and complete one of the multiple circuits.

Over the course of a specific period of time, the disk switch 204 will come into contact with all of the RPC's 203. The specified period of time can be altered through the changing of the variable motor's 205 speed through the VSS 103. For example, if initially the speed of the variable motor 205 was set to 1 rotation per hour with the VSS 103 in position 1, it could be changed to have 2 rotations per hour by moving the toggle on the VSS 103 to position 2 and if the toggle of the VSS 103 was moved to position 3 then it would rotate 4 times per hour, et cetera.

The description of the present invention has been presented for the purpose of illustrating and description, but is not intended to be exhausted or limited to the invention in the form disclosed. The embodiment was chosen to best explain the functions capable of such a device and a practical example of use for such a device.

What is claimed is:

1. A multiple outlet sequenced power strip comprising:
   a housing,
   multiple output outlets on the housing,
   an input outlet on the housing,
   a variable speed switch with multiple positions on the housing,
   multiple rotational points of contact made of a metal conductor equal to the number of output outlets and each rotational point of contact connected to a respective output outlet,
   a disk switch made of a metal conductor and connected to the input outlet,
   a variable speed motor with a variable speed and an alterable period of time for a rotation controlled by the variable speed switch multiple positions,
   and a rotating shaft,
   wherein the rotating shaft rotatably connects the variable speed motor to the disk switch such that the disk switch will come into contact with at least one of the multiple rotational points of contact and connect the input outlet to at least one of the multiple output outlets as the disk switch rotates and over the alterable period of time of the rotation, the disk switch comes into contact with all of the multiple rotational points of contact.

2. The multiple outlet sequenced power strip of claim 1, wherein only a specific number of the multiple output outlets is connected to the input outlet at any one time.

3. The multiple outlet sequenced power strip of claim 1, wherein equal amounts of power are consumed at each of the multiple output outlets over the alterable period of time.

* * * * *